(12) United States Patent
Taylor et al.

(10) Patent No.: US 7,185,754 B2
(45) Date of Patent: Mar. 6, 2007

(54) CONVEYOR

(75) Inventors: Alfred Alexander Taylor, Lugarno (AU); Garry Ronald MacKay, Lidcombe (AU)

(73) Assignee: TNA Australia Pty Limited, Lidcombe (AU)

( * ) Notice: Subject to any disclaimer, the term of this patent is extended or adjusted under 35 U.S.C. 154(b) by 144 days.

(21) Appl. No.: 10/986,565

(22) Filed: Nov. 10, 2004

(65) Prior Publication Data

US 2005/0155840 A1 Jul. 21, 2005

(30) Foreign Application Priority Data

Nov. 18, 2003 (AU) .............................. 2003906367

(51) Int. Cl.
*B65G 25/00* (2006.01)
(52) U.S. Cl. ............... 198/750.14; 198/764; 198/861.6
(58) Field of Classification Search ............ 198/369.2, 198/369.5, 457.03, 750.1, 750.14, 764, 861.6
See application file for complete search history.

(56) References Cited

U.S. PATENT DOCUMENTS

| | | | |
|---|---|---|---|
| 2,334,384 A * | 11/1943 | Cohen ..................... 198/369.5 |
| 4,282,964 A * | 8/1981 | Hogenkamp et al. ........ 198/358 |
| 4,387,798 A | 6/1983 | Jamison et al. |
| 5,117,961 A * | 6/1992 | Nicholson ................ 198/369.5 |
| 5,168,978 A * | 12/1992 | Cox et al. ................ 198/369.5 |
| 5,188,210 A | 2/1993 | Malow |
| 5,238,240 A * | 8/1993 | Prim et al. .................. 271/299 |
| 5,911,300 A | 6/1999 | Mraz |
| 6,079,548 A | 6/2000 | Svejkovsky et al. ..... 198/750.8 |
| 6,220,427 B1 * | 4/2001 | Ratz et al. ............... 198/861.2 |
| 6,899,218 B2 * | 5/2005 | Kwasniewicz et al. .. 198/750.7 |

FOREIGN PATENT DOCUMENTS

| FR | 2835819 A1 | 8/2003 |
|---|---|---|
| GB | 2147864 A | 5/1985 |

\* cited by examiner

*Primary Examiner*—Joe Dillon, Jr.
(74) *Attorney, Agent, or Firm*—Townsend and Townsend and Crew LLP

(57) ABSTRACT

A conveyor (10) that delivers product to a plurality of transverse conveyors of chutes (11). The conveyor (10) includes conveyor segments (12) along which the product is conveyed. Product is removed from the conveyor (10) by the lateral displacement of an upstream end 15 or a downstream end 16 of adjacent conveyor segments (12).

19 Claims, 2 Drawing Sheets

CONVEYOR

TECHNICAL FIELD

The present invention relates to conveyors and more particularly to conveyors that have at spaced locations along the conveyors means enabling removal of items being conveyed.

BACKGROUND OF THE INVENTION

The packaging industry, particularly in the packaging of snack foods, uses conveyors to transport product to be packaged to spaced packaging locations. At each location there are typically a weighing machine and a packaging machine that place weighed batches of product in bags.

The conveyors need to feed sufficient product to each packaging machine. Accordingly, at spaced locations along the conveyor, product is removed and delivered to the packaging machine. Typically, the product is removed by having the conveyors provided with gates that are opened and closed and through which the product is removed from the conveyor and delivered to a further conveyor extending to the associated packaging machine. Typically, these further conveyors are transverse of the primary conveyor.

A known conveyor is a slip conveyor. A slip conveyor has a conveyor surface that is vibrated longitudinally to transport product longitudinally of the conveyor. Where a number of conveyor surfaces are provided, it is known to displace the conveyor surfaces longitudinally to provide a gap between adjacent surfaces through which product is delivered.

The above-discussed conveyor arrangements have a number of disadvantages including insufficient control of the delivery of product to the transverse conveyors and problems with respect to cleaning.

SUMMARY OF THE INVENTION

It is an object of the present invention to overcome or substantially ameliorate the above disadvantage.

There is disclosed herein a conveyor assembly including:
a base;
a first conveyor segment having a longitudinally extending conveyor surface upon which items to be conveyed are longitudinally transported, the segment having an upstream end and a downstream end, the upstream end being provided to receive the item;
a second conveyor segment mounted on the base, the second segment having a longitudinally extending conveyor surface upon which the items to be conveyed are longitudinally transported, the second segment having an upstream end and a downstream end, with the second segment being mounted relative to the first segment so that items leaving the first segment downstream end are delivered to the second segment upstream end;
the segments being mounted to provide for relative lateral displacement between the first segment downstream end relative to the second segment upstream end from an aligned position at which a desired quantity of the items pass from the first segment to the second segment, and a displaced position at which a further desired quantity of the items is removed from the conveyor as a result of relative displacement between the first segment downstream end and the second segment upstream end to thereby provide the lateral relative displacement; and
a transverse conveyor positioned below the first segment downstream end and the second segment upstream end so that items leaving the first segment downstream end and not delivered to the second segment upstream end are delivered to the transverse conveyor.

Preferably, both conveyor surfaces are upwardly facing, and at least one of the segments is mounted for angular movement to provide for relative angular movement between the first segment downstream end and the second segment upstream end.

Preferably, the first segment downstream end is located above the second segment upstream end.

Preferably, at least one of the segments is pivotally mounted so as to be movable in a generally horizontal plane to change the relative position of the first segment downstream end with respect to the second segment upstream end.

Preferably, there is further provided a transverse conveyor positioned below the first segment downstream end and the second segment upstream end so that items leaving the first segment downstream end and not delivered to the second segment upstream end are delivered to the transverse conveyor.

Preferably, each segment is a slip conveyor.

Preferably, the segments are linear conveyors.

Preferably, the first segment is pivotally moved in a generally horizontal plane relative to the second segment.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
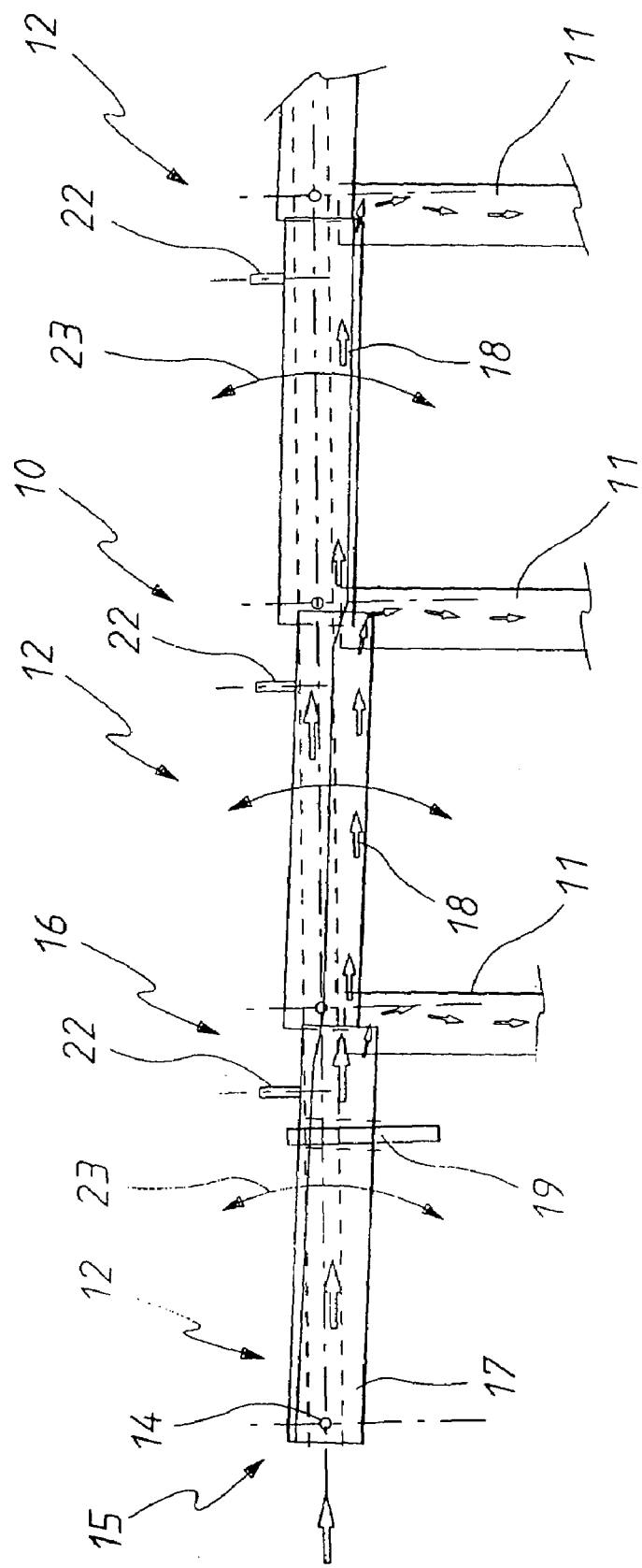
FIG. 1 is a schematic top plan view of a conveyor.
Figure 2:
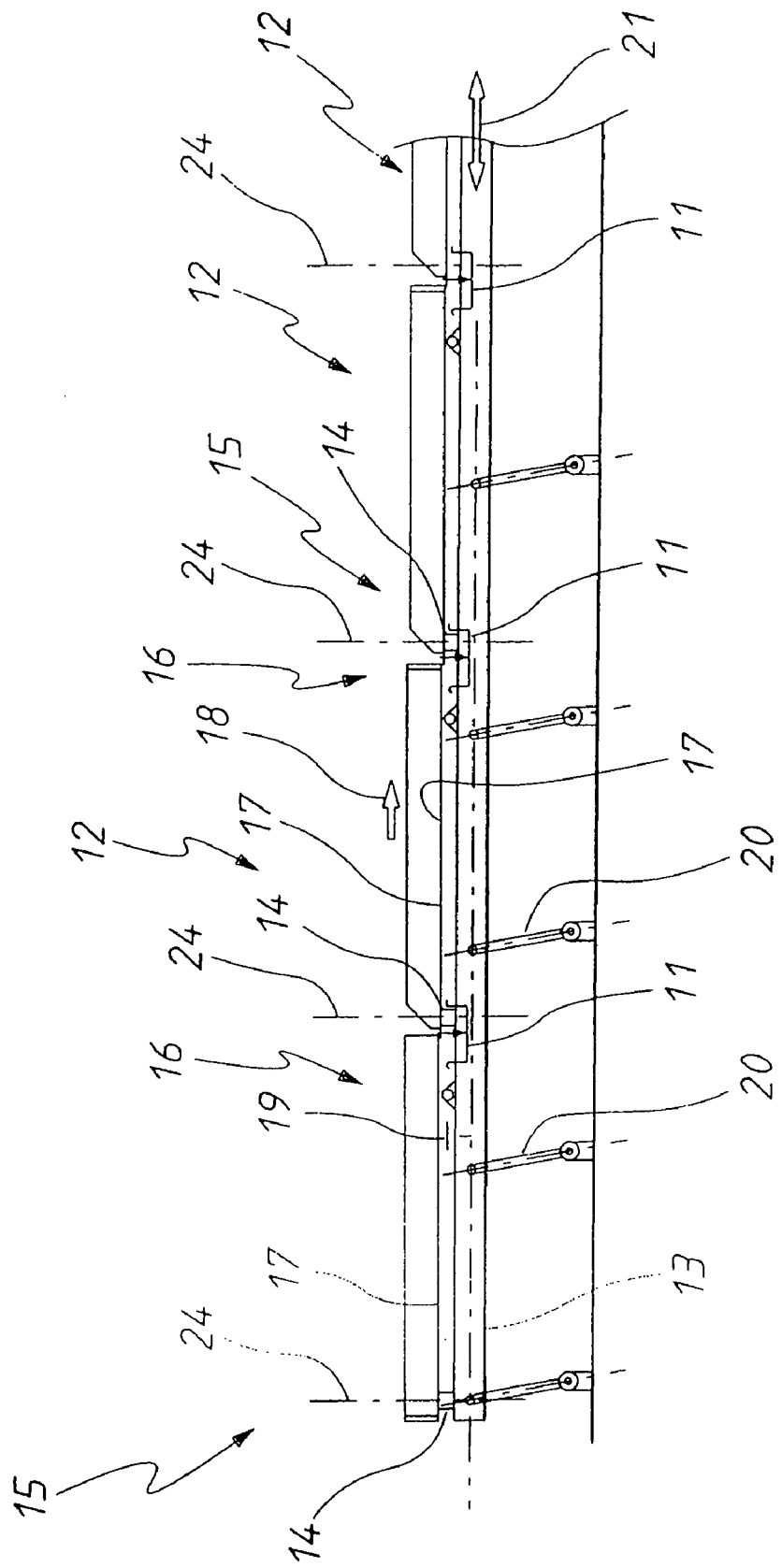
FIG. 2 is a schematic side elevation of the conveyor of FIG. 1.

In the accompanying drawings there is schematically depicted a linear slip conveyor 10 that delivers product to a plurality of transverse conveyors or chutes 11. Typically, if the conveyor 10 is used to transport snack foods, the product is delivered from the transverse conveyors 11 to a packaging machine.

The conveyor 10 includes a plurality of conveyor segments 12 that are mounted on a base 13. The base 13 is longitudinally extending so as pass beneath each of the segments 12. Each segment 12 includes an upstream end 15, and a downstream end 16 between which a generally horizontal conveyor surface 17 passes. Product is located on each surface 17 so as to be conveyed thereby in the direction of the arrows 18.

Preferably each segment 12 is pivotally mounted on the base 13 by means of a shaft 14 at or adjacent the upstream end 15. By this, the arrangement at each downstream end 16 can be laterally displaced without any significant displacement of the upstream end 15 of that segment 12. Associated with each segment 12 is a slide member 19 upon which the associated segment slidably rests. The base 13 is supported on a plurality of pivotally mounted arms 20, with the base caused to reciprocate in the direction of the arrow 21 so that the conveyor 12 operates as a slip conveyor.

The segments 12 overlap so that the downstream end 16 of each segment 12 is located above the upstream end 15 of the next adjacent downstream segment 12.

Attached to each segment 12 is a motor 22 such as an air or hydraulic cylinder. Operation of each motor 22 causes pivoting of the associated segment 12 angularly in the direction of the arcuate arrows 23. Pivoting of each segment 12 is about a generally vertical axis 24 provided by the respective shaft 14. This angular movement is further provided by each segment 12 being slidably supported on its respective slide member 19.

By operation of the motors 22, the alignment of each overlapping downstream end 16 with respect to its associated upstream end 15 can be adjusted. By displacing each downstream end 16 laterally relative to its associated upstream end 15, product is allowed to leave the downstream end 16 and be delivered to the adjacent transverse conveyor 11. The greater the degree of misalignment the more product that is delivered to the associated transverse conveyor 11. Accordingly, in the above-described preferred embodiment, the delivery of product to the transverse conveyors can be better controlled. This is at least partly due to the motors 22 being operable to "continuously" vary the alignment of the ends 15 and 16.

In an alternative embodiment the downstream upstream end 15 could be laterally displaced rather than the downstream end 16.

The invention claimed is:

1. A conveyor assembly including:
   a first slip conveyor segment having a longitudinally extending conveyor surface upon which items to be conveyed are longitudinally transported, the segment having an upstream end and a downstream end, the upstream end being provided to receive said item;
   a second slip conveyor segment, said second segment having a longitudinally extending conveyor surface upon which the items to be conveyed are longitudinally transported, the second segment having an upstream end and a downstream end, with said second segment being mounted relative to said first segment so that items leaving the first segment downstream end are delivered to the second segment upstream end,
   said segments being mounted to provide for lateral displacement between the first segment downstream end relative to the second segment upstream end from an aligned position at which a desired quantity of said items pass from said first segment to said second segment, and a displaced position at which a further desired quantity of said items is removed from said conveyor as a result of relative displacement between the first segment downstream end and the second segment upstream end; and
   a transverse conveyor positioned below said first segment downstream end and said second segment upstream end so that items leaving said first segment downstream end and not delivered to said second segment upstream end are delivered to said transverse conveyor.

2. The conveyor assembly of claim 1, wherein both conveyor surfaces are upwardly facing, and at least one of said segments is mounted for angular movement to provide for relative angular movement between the first segment downstream end and the second segment upstream end.

3. The conveyor assembly of claim 2, wherein at least one of said segments is pivotally mounted so as to be movable in a generally horizontal plane to change the relative position of the first segment downstream end with respect to the second segment upstream end to thereby provide said lateral displacement.

4. The conveyor assembly of claim 1, wherein said segments are linear conveyors.

5. The conveyor assembly of claim 4, wherein said first segment is pivotally moved in a generally horizontal plane relative to said second segment.

6. A conveyor assembly including:
   a first slip conveyor segment having a longitudinally extending conveyor surface upon which items to be conveyed are longitudinally transported, the segment having an upstream end and a downstream end, the upstream end being provided to receive said item;
   a second slip conveyor segment, said second segment having a conveyor longitudinally extending surface upon which the items to be conveyed are longitudinally transported, the second segment having an upstream end and a downstream end, with said second segment being mounted relative to said first segment so that items leaving the first segment downstream end are delivered to the second segment upstream end,
   said segments being mounted to provide for lateral displacement between the first segment downstream end relative to the second segment upstream end from an aligned position at which a desired quantity of said items pass from said first segment to said second segment, and a displaced position at which a further desired quantity of said items is removed from said conveyor as a result of relative displacement between the first segment downstream end and the second segment upstream end, with the first segment downstream end being located above the second segment upstream end; and
   a transverse conveyor positioned below said first segment downstream end and said second segment upstream end so that items leaving said first segment downstream end and not delivered to said second segment upstream end are delivered to said transverse conveyor.

7. The conveyor assembly of claim 6, wherein both conveyor surfaces are upwardly facing, and at least one of said segments is mounted for angular movement to provide for relative angular movement between the first segment downstream end and the second segment upstream end.

8. The conveyor assembly of claim 7, wherein at least one of said segments is pivotally mounted so as to be movable in a generally horizontal plane to change the relative position of the first segment downstream end with respect to the second segment upstream end to thereby provide said lateral displacement.

9. The conveyor assembly of claim 6, wherein said segments are linear conveyors.

10. The conveyor assembly of claim 9, wherein said first segment is pivotally moved in a generally horizontal plane relative to said second segment.

11. A conveyor assembly including:
    a first slip conveyor segment having a longitudinally extending conveyor surface upon which items to be conveyed are longitudinally transported, the segment having an upstream end and a downstream end, the upstream end being provided to receive said item;
    a second slip conveyor segment mounted on the base, said second segment having a conveyor longitudinally extending surface upon which the items to be conveyed are longitudinally transported, the second segment having an upstream end and a downstream end, with said second segment being mounted relative to said first segment so that items leaving the first segment downstream end are delivered to the second segment upstream end,
    said segments being mounted to provide for lateral displacement between the first segment downstream end relative to the second segment upstream end from an aligned position at which a desired quantity of said items pass from said first segment to said second segment, and a displaced position at which a further desired quantity of said items is removed from said conveyor as a result of relative displacement between the first segment downstream end and the second segment upstream end, with at least one of said segments being pivotally mounted so as to be movable in a generally horizontal plane to change the relative position of the first segment downstream end with respect to the second segment upstream end to thereby provide said lateral displacement; and a transverse conveyor positioned below said first segment downstream end and said second segment upstream end so that items leaving said first segment downstream end and not delivered to said second segment upstream end are delivered to said transverse conveyor.

12. The conveyor assembly of claim 11, wherein both conveyor surfaces are upwardly facing, and at least one of said segments is mounted for angular movement to provide for relative angular movement between the first segment downstream end and the second segment upstream end.

13. The conveyor assembly of claim 12, wherein the first segment downstream end is located above the second segment upstream end.

14. The conveyor assembly of claim 13, wherein said segments are linear conveyors.

15. The conveyor assembly of claim 14, wherein said first segment is pivotally moved in a generally horizontal plane relative to said second segment.

16. A conveyor assembly including:

a first slip conveyor segment having a longitudinally extending conveyor surface upon which items to be conveyed are longitudinally transported, the segment having an upstream end and a downstream end, the upstream end being provided to receive said item;

a second slip conveyor segment, said second segment having a conveyor longitudinally extending surface upon which the items to be conveyed are longitudinally transported, the second segment having an upstream end and a downstream end, with said second segment being mounted relative to said first segment so that items leaving the first segment downstream end are delivered to the second segment upstream end, said segments being mounted to provide for lateral displacement between the first segment downstream end relative to the second segment upstream end so that a desired quantity of said items pass from said first segment to said second segment, with a further desired quantity of said items being removed from said conveyor as a result of relative displacement between the first segment downstream end and the second segment upstream end; and a transverse conveyor positioned below said first segment downstream end and said second segment upstream end so that items leaving said first segment downstream end and not delivered to said second segment upstream end are delivered to said transverse conveyor.

17. The conveyor assembly of claim 16, wherein both conveyor surfaces are upwardly facing, and at least one of said segments is mounted for angular movement to provide for relative angular movement between the first segment downstream end and the second segment upstream end.

18. The conveyor assembly of claim 17, wherein the first segment downstream end is located above the second segment upstream end.

19. The conveyor assembly of claim 18, wherein at least one of said segments is pivotally mounted so as to be movable in a generally horizontal plane to change the relative position of the first segment downstream end with respect to the second segment upstream end to thereby provide said lateral displacement.

\* \* \* \* \*